United States Patent
Lecomte et al.

(10) Patent No.: US 9,344,746 B2
(45) Date of Patent: *May 17, 2016

(54) PROCESS AND DEVICE FOR THE PROTECTION AND DISPLAY OF VIDEO STREAMS

(71) Applicant: OL Security Limited Liability Company, Dover, DE (US)

(72) Inventors: Daniel Lecomte, Paris (FR); Pierre Sarda, Asnieres-sur-Seine (FR)

(73) Assignee: OL Security Limited Liability Company, Dover, DE (US)

( * ) Notice: Subject to any disclaimer, the term of this patent is extended or adjusted under 35 U.S.C. 154(b) by 383 days.

This patent is subject to a terminal disclaimer.

(21) Appl. No.: 13/648,024

(22) Filed: Oct. 9, 2012

(65) Prior Publication Data

US 2013/0036436 A1    Feb. 7, 2013

Related U.S. Application Data

(63) Continuation of application No. 10/544,659, filed as application No. PCT/FR2004/050045 on Feb. 5, 2004, now Pat. No. 8,311,125.

(30) Foreign Application Priority Data

Feb. 7, 2003    (FR) ..................... 03 01493

(51) Int. Cl.
*H04N 7/12*    (2006.01)
*H04N 11/02*   (2006.01)
(Continued)

(52) U.S. Cl.
CPC ....... *H04N 21/234345* (2013.01); *H04N 7/165* (2013.01); *H04N 19/46* (2014.11);
(Continued)

(58) Field of Classification Search
CPC ........................................ H04N 19/46
USPC ................................... 375/240.26
See application file for complete search history.

(56) References Cited

U.S. PATENT DOCUMENTS 6,285,774 B1    9/2001  Schumann et al.
6,330,672 B1   12/2001  Shur
(Continued)

FOREIGN PATENT DOCUMENTS

EP    0971350 A1    1/2000

OTHER PUBLICATIONS

Deepthi Anand et al., "Watermarking Medical Images with Patient Information," Proceedings of the 20th Annual International Conference of the IEEE Engineering in Medicine and Biology Society, vol. 20, No. 2, 1998, pp. 703-706.
(Continued)

*Primary Examiner* — Jeremaiah C Hallenbeck-Huber
(74) *Attorney, Agent, or Firm* — Panitch Schwarze Belisario & Nadel LLP

(57) ABSTRACT

A process distributing video streams to a plurality of addressees, comprising a marking step comprising adding at least one visual element to a video stream, which marking step is applied to an original video stream common to all the addressees and which is personalized for each addressee by addition of a visual element specific to the addressee that allows rapid visual identification of the addressee, wherein the added visual element replaces part of the original video stream that is stored in complementary information on a multimedia server.

52 Claims, 1 Drawing Sheet

(51) Int. Cl.

| | |
|---|---|
| *H04N 11/04* | (2006.01) |
| *H04N 21/2343* | (2011.01) |
| *H04N 19/46* | (2014.01) |
| *H04N 7/16* | (2011.01) |
| *H04N 21/235* | (2011.01) |
| *H04N 21/254* | (2011.01) |
| *H04N 21/258* | (2011.01) |
| *H04N 21/435* | (2011.01) |
| *H04N 21/462* | (2011.01) |
| *H04N 21/4722* | (2011.01) |
| *H04N 21/658* | (2011.01) |
| *H04N 21/835* | (2011.01) |
| *H04N 19/467* | (2014.01) |

(52) U.S. Cl.
CPC .......... *H04N 19/467* (2014.11); *H04N 21/235* (2013.01); *H04N 21/2541* (2013.01); *H04N 21/25883* (2013.01); *H04N 21/435* (2013.01); *H04N 21/4622* (2013.01); *H04N 21/4722* (2013.01); *H04N 21/6581* (2013.01); *H04N 21/835* (2013.01)

(56) References Cited

U.S. PATENT DOCUMENTS

| | | | |
|---|---|---|---|
| 6,373,530 B1 | 4/2002 | Birks et al. | |
| 6,381,367 B1 | 4/2002 | Ryan | |
| 7,058,809 B2 | 6/2006 | White et al. | |
| 7,206,409 B2 | 4/2007 | Antonellis et al. | |
| 7,269,622 B2 | 9/2007 | Brown et al. | |
| 7,336,712 B1 * | 2/2008 | Linnartz et al. | 375/240.26 |
| 7,349,553 B2 * | 3/2008 | Rodriguez | 382/100 |
| 7,430,302 B2 | 9/2008 | Thorwirth | |
| 7,440,584 B2 | 10/2008 | Yeung et al. | |
| 7,443,982 B2 | 10/2008 | Stone et al. | |
| 7,765,567 B2 * | 7/2010 | Candelore et al. | 725/32 |
| 2002/0025777 A1 | 2/2002 | Kawamata et al. | |
| 2002/0087976 A1 * | 7/2002 | Kaplan et al. | 725/34 |
| 2003/0001846 A1 * | 1/2003 | Davis et al. | 345/474 |
| 2005/0257067 A1 | 11/2005 | Roberts | |

OTHER PUBLICATIONS

Mercy George et al., "Digital Watermarking of Images and Video Using Direct Sequences Spread Spectrum Techniques," Proceedings of the 1999 IEEE Canadian Conference on Electrical and Computer Engineering, Shaw Conference Center, Edmonton, Alberta, Canada, May 9-12, 1999, pp. 116-121.

Gwenaël Doërr et al., "A Guide Tour of Video Watermarking," Signal Processing: Image Communication, Elsevier Science B.V., vol. 18, No. 4, Apr. 2003, pp. 263-282.

* cited by examiner

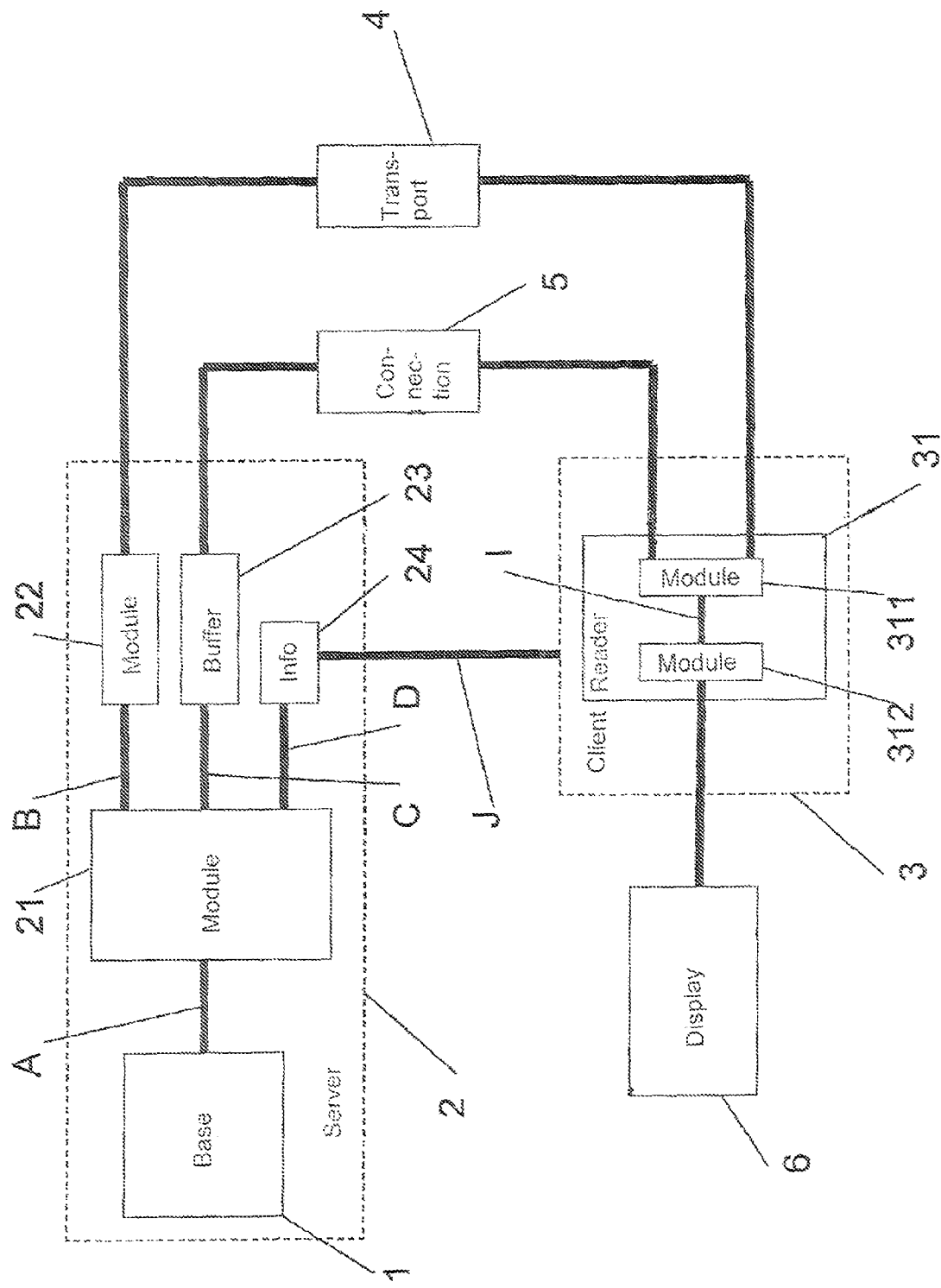

PROCESS AND DEVICE FOR THE PROTECTION AND DISPLAY OF VIDEO STREAMS

RELATED APPLICATIONS

The instant application is a continuation of U.S. patent application Ser. No. 10/544,659, filed Aug. 30, 2005 entitled VIDEO STREAM DISPLAY AND PROTECTION METHOD AND DEVICE, the contents of which are expressly incorporated herein by reference in its entirety. That application is a US national filing of PCT/FR2004/50045, filed on Feb. 5, 2004, which claims priority to French application FR03/01493 filed on Feb. 7, 2003.

FIELD OF THE INVENTION

This invention relates to a process for the distribution of digital video streams which prevents the streams from being illegally copied and/or distributed by the addition into the streams of visual elements concerning each person receiving the original stream. Addition of personalized visual elements permits immediate identification of the person for whom the original film is intended in such a manner that once taken out of its context of normal and authorized reading, reading the video stream allows the authentication of the origin of the fraud, e.g., in the case of pirating or of illicit distribution of copies of these audiovisual streams. This allows the source of the fraud to be traced if it took place and has a dissuasive effect on any ill-intentioned person.

BACKGROUND

Tattooing effects are known that permit the insertion into a video stream of visual elements that can not be detected by the human eye, but can be recognized by a computer program, even after several manipulations of the video stream. These visual elements can also be personalized for one or several users. The disadvantage of the existing solutions is that they do not allow for detection of a fraudulent copy without employing complex techniques for the analysis of the video stream.

SUMMARY OF THE INVENTION

This invention relates to a process for distributing video streams to a plurality of addressees, including a marking step including adding at least one visual element to a video stream, which marking step is applied to an original video stream common to all of the addressees and which is personalized for each addressee by addition of a visual element specific to the addressee that allows rapid visual identification of the address, wherein the added visual element replaces part of the original video stream that is stored in complementary information on a multimedia server.

This invention also relates to a system for distributing video streams including a marking module including a module for generating visual elements personalized for each user, a module for inserting the visual elements into the original stream, thereby producing a marked stream and complementary information stored in the server, and a module for removing the marking in which reconstitution of the original stream is performed from the marked stream and the complementary information sent by the server.

BRIEF DESCRIPTION OF THE DRAWING

FIG. 1 is a schematic diagram of a system for protecting and displaying video streams in accordance with aspects of the invention.

DETAILED DESCRIPTION

This invention permits the immediate identification without supplementary means of a fraudulent copy while leaving the video stream in plain text, i.e. non-encrypted during an authorized display.

The invention is based on a client-server system which identifies a person who desires to display a video stream and identify the reading device on which the display will be made. These identifications allow the user to first recover on a personal or another reading device (sent physically by CD-ROM or DVD, or downloaded to onto a computer or a decoder (set-top box)) a version of the video stream selected by the user and adapted for use. Before or during this transmission the server will perform the appropriate adaptation of the stream for this client. For example, if the client reserves a film in advance, the visual elements are introduced by the server and a modified stream is downloaded into the memory or onto the hard disk of the reading equipment of the client. If the client desires to view a film immediately, the server introduces the appropriate visual elements gradually and transmits the modified stream to the user in real time.

The original stream to which personalized visual elements were added will be referred to as "modified stream" or "marked stream" in the following description. At the moment of reading the modified stream that is stored on the client apparatus, a new client-server connection is necessary so that during the viewing of the modified stream, no visual element for the identification of the client appears on the viewing screen. On the other hand, if the modified stream has left the client apparatus (by means of a copy or a downloading) while is being read onto another device that has no connection to the server, the visual elements are displayed.

Generation of the protected video stream is adapted to the user and carried out by the server. The latter analyses the original video stream to insert supplementary visual data that is superposed on the video stream or replaces the original content. The operation comprises analyzing the original video stream to designate the position (static or dynamic), the type and quantity of visual elements to be inserted as well as the number of insertions and their appearance time on the screen. In some cases, the visual elements never appear at the same location during the reading of the protected stream and its content furnishes a maximum amount of information concerning the user authorized to see the film, such as name, address, telephone numbers or any information that can identify or rapidly authenticate the person. All this information relative to the client will be referred to as "authenticating information" in the following description. The server analyzes the stream and changes a certain amount of information in the original stream with visual elements of the same format or compatible with the original information. The original information is extracted from the stream, stored on the server and replaced by visual elements relative to the user. This operation is called "marking" and produces the modified stream. The original information stored on the server is called "complementary information." It is also possible to superpose the visual elements on the original film.

The resulting modified stream is advantageously totally compatible with the norm or the standard with which the original stream was generated.

Restitution of the original video stream takes place on equipment compatible with the invention and that will make a connection to the server to recover the complementary information that it saves in real time during the reading of the protected video stream and realize the restitution of the original stream. This operation is referred to as "removal of the marking," "unmarking or "demarking." Without the operation of the recovery of the complementary information in real time from the server, only the stream marked with the visual elements is displayed and, therefore, all the information concerning the client is displayed storing the entire duration of viewing. Thus, a viewing of the original stream is only possible on the suitable client equipment and any other form of display will display this authenticating information. Any person in possession of a non-authorized copy of the modified video stream also has all the personal authenticating information to find the client at the origin of this copy.

However, the presence of visible visual elements might tempt ill-intentioned persons to make them disappear. Since the visual elements were inserted in the video stream by replacing original parts, the ill-intentioned person might insert visible traces to hide the visual elements indicating the origin of the video stream. However, the information about positions of the visual elements in terms of a selection of modified frames, about the position in the frame selected, about the form and the size of the visual element inserted remain visible and can be found again by an adequate processing. Since the marking was made by the server, all the information relative to the position, form size of the mark and to the number of frames into which it was inserted are known to the server, that identifies each user in a unique manner. The knowledge of this information is therefore sufficient to identify the ill-intentioned person who substituted the visual elements by visible traces.

The presence of visible visual objects might also tempt several users of the same distribution group, since they have access to the same film, to compare the differently marked video streams that they have and to make a new one from them of which all or part of the visual objects would have been removed by combining the non-modified parts or by replacing a picture containing a visual object by an original picture. To prevent this problem, the process in conformity with the invention provides that the form, color, size of the visual objects and the number of frames in which the visual object is inserted are obtained for each user from a combinatory method relative to a group of users and that the visual object contains at least one visual part with an identical position for all the users of the group representing an identifier of this group of users.

The operations of marketing transmission, removal of the marking and a display can be made sequentially in real time during a single client-server connection.

In its most general meaning the invention relates to a process for the distribution of video streams to a plurality of addressees, comprising a marking stage that adds at least one visual element to the video stream, which marking stage is applied to an original video stream common to all the addressees and which is personalized for each addressee by the addition of a visual elements specific to the addressee that allows a rapid visual identification of the addressee, characterized in that the added visual element replaces part of the original video stream that is stored in the complementary information on the multimedia server.

The visual element is advantageously generated in two stages. The first stage processes the marking data with any format in such a manner as to generate marking objects describing the visual element to be displayed and the second stage adds the visual element into the video stream.

Reconstitution of the original stream is advantageously carried out on the client equipment from the modified stream and from complementary information sent by the server after authentication of the client and as a function of rights for being read and viewed without the display of the visual elements.

The marking stage can allow inclusion in the video stream of all types of visual elements whose form, position and color are determined.

The marking stage can also allow inclusion in the video stream of all types of visual elements whose form, position and color are variable.

The process may comprise a control stage for authorizing one or several private copies. The complementary information is advantageously sent in real time.

The position, form, color, size of the visual object inserted and the number of frames into which the visual object is inserted may be unique and personalized for each user.

The position, form, size of the visual objects inserted and the number of frames into which the visual object is inserted may be obtained from a combinatory method relative to a group of users and the visual object contains at least one part with an identical position for all the users of the group representing an identifier of this group of users.

The invention also relates to a system for carrying out the process for the distribution of video streams comprising a marking module comprising a module for generating visual elements personalized for each user, a module for inserting these visual elements into the original stream, thus producing a marked stream and complementary information stored in the server, and a module for removing the marking in which reconstitution of the original stream is performed from the marked stream and the complementary information sent by the server.

A particular example includes distributing films coded in conformity with the MPEG-2 norm.

Referring to FIG. 1, when a client 3 connects to server 2 for ordering a film A, the client selects a film A in a list supplied by server 2 and relative to the content of film base 1. Once the selection and order transaction have been validated by server 2, the latter transforms film A selected in base 1 into a film B that contains, in visual form and included in the video stream, the personal information 24 of the client. Personal information 24 of the client is constituted during membership to the service and, especially during a connection J, and stored in a database of personal information 24 at the level of server 2.

A digital video stream of the MPEG-2 type is constituted of sequence of pictures (or planes or frames) regrouped in groups of pictures (GOP's). A picture can be of the I type (Intra), P type (predicted) or B (bidirectional). The I pictures are the reference pictures. They are entirely coded and are therefore of an elevated size and do not contain information about the movement. The I pictures are constituted of slices that themselves contain macroblocks and blocks.

The transformation is performed by module 21 and comprises this non-limiting example in changing a slice of an I picture and all the ten I pictures. The position of the slice is selected randomly in the picture and the slice is replaced by a slice created in such a manner as to be inserted perfectly into binary stream A while respecting the size of the picture and the composition of the macroblocks. The slice substitution operation is rendered visually by the appearance of a black band containing a text in white characters and giving the "last name, first name, address, telephone No." of the client determined from the personal data D stored in the personal information base 24 of server 2. Complementary information C, that is, the content and the position in the picture of each slice removed as well as the number of the picture concerned are stored in buffer 23 of server 2.

Module 22 permits modified stream B to be prepared for its transport to client 3 by transport means 4. For example, film B is recorded on a physical support such as, e.g., a disk and sent by mail to the client 3. Upon receiving the disk, user 3 can read it in disk reader 31 because the stream received is totally compatible with the MPEG-2 norm.

Either disk reader 31 of the client 3 has module 311 necessary for the client-server connection 5, in which case during the reading of the disk, the module 311 included in disk reader 31 will recover via telecommunication network 5 the complementary information C contained in buffer 23 to compose, prior to the display on viewing screen 6, a stream I identical to original stream A, that is, without the presence of authenticating information. Stream I is then decoded in a known manner by module 312 of module 31, which module 312 is a standard video MPEG-2 reader. At the output of module 312 the display is made on viewing screen 6.

Or, if DVD reader 31 of client 3 is not equipped with the system 311 or if it does not succeed in identifying itself correctly via connection 5, in this case the white-on-black text band, appears on all 10 I pictures on screen 6 since stream I had not been transformed by module 311.

Every private copy of the disk is viewable without authenticating information in the same manner as the original disk on any module authorized to display it as a function of the client rights.

If copies are made by the client for a fraudulent use (e.g., for resale or distribution), the authenticating information can be read by a person who sees it on a reader and any person finding such an illicit copy can go back to the source of the copy with the aid of the personal information contained in these text bands.

Another example comprises the fact that the visual elements are no longer authenticating information, but rather modified slices containing text or parts of any picture. For example, only a first user authorized to view the film can view it after the removal of marking performed by module 311. In the case in which the film is copied in a fraudulent manner by a second user who is not authorized, the second user sees the film with the visual elements displayed and therefore the visual quality of the film is degraded. Every user authorized to view the film can view it on any device 31 by means of its parameters for identifying it to the server necessary for authorizing the connection via network 5.

The invention claimed is:

1. A process for distributing video streams, the process comprising:
   adding at least one visual element to an original video stream, wherein the at least one visual element is personalized for a respective addressee, in that the at least one visual element for the respective addressee is different from the at least one visual element for substantially any other addressee, wherein the at least one visual element comprises at least one item of information, and wherein adding the at least one visual element includes replacing at least one portion of the original video stream with the at least one visual element to generate a marked video stream;
   providing the marked video stream to the respective addressee via a first transport means; and
   providing complementary information, incorporating the at least one portion of the original video stream, to the respective addressee via a second transport means, different from the first transport means, in response to authentication of the respective addressee;
   wherein the at least one item of information is configured to appear in its entirety within a single frame of the marked video stream;
   wherein the marked video stream is configured such that display of the marked video stream without reconstruction using the complementary information causes the at least one item of information to be visible to an unaided eye; and
   wherein one or more frames containing the at least one item of information are present in the marked video stream, such that the at least one item of information is enabled to be displayed one or more times in the marked video stream.

2. The process according to claim 1, wherein adding at least one visual element comprises:
   processing marking data with any format in such a manner as to generate marking objects describing a visual element to be displayed; and
   adding the visual element into the original video stream.

3. The process according to claim 1, wherein the complementary information is configured to enable viewing of the video stream without display of the at least one visual element to the respective addressee.

4. The process according to claim 1, wherein adding at least one visual element further comprises adding at least one visual element whose form, position and color are determined.

5. The process according to claim 1, wherein adding at least one visual element further comprises adding at least one visual element whose form, position and color are variable.

6. The process according to claim 1, further comprising authorizing one or several private copies.

7. The process according to claim 1, wherein the providing the complementary information is performed in real time, as the video stream is being reconstructed and displayed by equipment of the respective addressee.

8. The process according to claim 1, wherein position, form, color, and size of the at least one visual element added in said adding and a number of frames into which the at least one visual element is added in said adding are unique and personalized for the respective addressee.

9. A process for distributing video streams, the process comprising:
   adding at least one visual element to an original video stream, wherein the at least one visual element is personalized for a respective addressee by addition of a visual element specific to the addressee, wherein the at least one visual element comprises at least one item of information, wherein adding the at least one visual element includes replacing at least one portion of the original video stream with the at least one visual element to generate a marked video stream;
   wherein the at least one item of information is configured to appear in its entirety within a single frame of the marked video stream;
   wherein the marked video stream is configured such that display of the marked video stream without reconstruction using the complementary information causes the at least one item of information to be visible to an unaided eye;
   wherein one or more frames containing the at least one item of information are present in the marked video stream, such that the at least one item of information is enabled to be displayed one or more times in the marked video stream; and wherein position, form, and size of the at least one visual element added in said adding and a number of frames into which the at least one visual element is added in said adding are obtained from a combinatory method relative to a group of addressees, and wherein the at least one visual object contains at least one part with an identical position for all addressees of the group, thereby representing an identifier of the group.

10. The process according to claim 9, further comprising:
transmitting the marked video stream to at least one addressee; and
transmitting complementary information to the at least one addressee to enable the at least one addressee to replace the at least one visual element with the part of the original video stream in the complementary information.

11. The process according to claim 10, wherein the complementary information includes position information corresponding to the part of the original video stream that is replaced during said adding.

12. An apparatus for distributing video streams, comprising:
means for adding at least one visual element to an original video stream, wherein the at least one visual element is personalized for a respective addressee, in that the at least one visual element for the respective addressee is different for substantially any other addressee, wherein the at least one visual element comprises at least one item of information, and wherein adding the at least one visual element includes replacing at least one portion of the original video stream with the at least one visual element to generate a marked video stream;
means for providing the marked video stream to the respective addressee via a first transport means; and
providing complementary information, incorporating the at least one portion of the original video stream, to the respective addressee via a second transport means, different from the first transport means, in response to authentication of the respective addressee;
wherein the at least one item of information is configured to appear in its entirety within a single frame of the marked video stream;
wherein the marked video stream is configured such that display of the marked video stream without reconstruction using the complementary information causes the at least one item of information to be visible to an unaided eye; and
wherein one or more frames containing the at least one item of information are present in the marked video stream, such that the at least one item of information is enabled to be displayed one or more times in the marked video stream.

13. A system including the apparatus according to claim 12, and further comprising:
means for removing the at least one visual element and reconstituting the original video stream from the marked video stream and the complementary information.

14. An apparatus for distributing video streams, comprising:
a server, including:
a video processing module configured to add at least one visual element to an original video stream, wherein the at least one visual element is personalized for a respective addressee, in that the at least one visual element for the respective addressee is different for substantially any other addressee, wherein the at least one visual element comprises at least one item of information, and wherein adding the at least one visual element includes replacing at least one portion of the original video stream with the at least one visual element to generate a marked video stream;
a transport module configured to provide to the respective addressee the marked video stream via a first transport means;
a connection module configured to provide complementary information, including the at least one portion of the original video stream, to the respective addressee via a second transport means, different from the first transport means, in response to authentication of the respective addressee;
wherein the at least one item of information is configured to appear in its entirety within a single frame of the marked video stream;
wherein the marked video stream is configured such that display of the marked video stream without reconstruction using the complementary information causes the at least one item of information to be visible to an unaided eye; and
wherein one or more frames containing the at least one item of information are present in the marked video stream, such that the at least one item of information is enabled to be displayed one or more times in the marked video stream.

15. The apparatus according to claim 14, further comprising:
at least one storage component configured to store the marked video stream.

16. The apparatus according to claim 14, wherein the complementary information includes position information corresponding to the part of the original video stream that is replaced by the video processing module.

17. The apparatus according to claim 14, further comprising a database of addressee information.

18. The apparatus according to claim 14, wherein the server is configured to provide control information to authorize one or several private copies.

19. The apparatus according to claim 14, wherein the complementary information is configured to enable viewing of the video stream without display of the at least one visual element.

20. The process of claim 14, wherein the at least one item of information is about the respective addressee.

21. A process for distributing video streams, the process comprising:
adding at least one visual element to an original video stream, wherein the at least one visual element is personalized for a respective addressee by addition of a visual element specific to the respective addressee, wherein the at least one visual element comprises at least one item of information, wherein adding the at least one visual element includes replacing at least one portion of the original video stream with the at least one visual element to generate a marked video stream;
providing the marked video stream to the respective addressee via a first transport means; and
providing complementary information, including the at least one portion of the original video stream, to the respective addressee via a second transport means, different from the first transport means, in response to authentication of the respective addressee;
wherein the at least one item of information is configured to appear in its entirety within a single frame of the marked video stream;
wherein the marked video stream is configured such that display of the marked video stream without reconstruction using the complementary information causes the at least one item of information to be visible to an unaided eye;
wherein one or more frames containing the at least one item of information are present in the marked video stream, such that the at least one item of information is enabled to be displayed one or more times in the marked video stream; and
wherein the at least one item of information includes a name, address, and/or telephone number of the respective addressee.

22. The process of claim 21, wherein the at least one item of information is about the addressee.

23. An apparatus for distributing video streams, comprising:
means for adding at least one visual element to an original video stream, wherein the at least one visual element is personalized for a respective addressee by addition of a visual element specific to the respective addressee, wherein the at least one visual element comprises at least one item of information, wherein adding the at least one visual element includes replacing at least one portion of the original video stream with the at least one visual element to generate a marked video stream;
means for providing the marked video stream to at least one addressee via a first transport means; and
means for providing complementary information, incorporating the at least one portion of the original video stream, to the at least one addressee via a second transport means, different from the first transport means, in response to authentication of the at least one addressee;
wherein the at least one item of information is configured to appear in its entirety within a single frame of the marked video stream;
wherein the marked video stream is configured such that display of the marked video stream without reconstruction using the complementary information causes the at least one item of information to be visible to an unaided eye;
wherein one or more frames containing the at least one item of information are present in the marked video stream, such that the at least one item of information is enabled to be displayed one or more times in the marked video stream; and
wherein the at least one item of information includes a name, address, and/or telephone number of the respective addressee.

24. The process of claim 23, wherein the at least one item of information is about the respective addressee.

25. An apparatus for distributing video streams, comprising:
a server, including:
a video processing module configured to add at least one visual element to an original video stream, wherein the at least one visual element is personalized for a respective addressee by addition of a visual element specific to the respective addressee, wherein the at least one visual element comprises at least one item of information, wherein adding the at least one visual element includes replacing at least one portion of the original video stream with the at least one visual element to generate a marked video stream;
a transport module configured to provide the marked video stream to the respective addressee via a first transport means; and
a connection module configured to provide complementary information, incorporating the at least one portion of the original video stream, to the respective addressee via a second transport means, different from the first transport means, in response to authentication of the respective addressee;
wherein the at least one item of information is configured to appear in its entirety within a single frame of the marked video stream;
wherein the marked video stream is configured such that display of the marked video stream without reconstruction using the complementary information causes the at least one item of information to be visible to the unaided eye;
wherein one or more frames containing the at least one item of information are present in the marked video stream, such that the at least one item of information is enabled to be displayed one or more times in the marked video stream; and
wherein the at least one item of information includes a name, address, and/or telephone number of the respective addressee.

26. A computer program product embodied on a non-transitory computer readable medium configured to distribute video streams, the product comprising:
code for adding at least one visual element to an original video stream, wherein the at least one visual element is personalized for a respective addressee, in that the at least one visual element for the respective addressee is different than for substantially any other addressee, wherein the at least one visual element comprises at least one item of information, wherein adding the at least one visual element includes replacing at least one portion of the original video stream with the at least one visual element to generate a marked video stream;
code for providing the marked video stream to the respective addressee via a first transport means; and
code for providing complementary information, incorporating the at least one portion of the original video stream, to the respective addressee via a second transport means, different from the first transport means, in response to authentication of the respective addressee;
wherein the at least one item of information is configured to appear in its entirety within a single frame of the marked video stream;
wherein the marked video stream is configured such that display of the marked video stream without reconstruction using the complementary information causes the at least one item of information to be visible to an unaided eye; and
wherein one or more frames containing the at least one item of information are present in the marked video stream, such that the at least one item of information is enabled to be displayed one or more times in the marked video stream.

27. The product according to claim 26, wherein the code for adding at least one visual element comprises:
code for processing marking data with any format in such a manner as to generate marking objects describing a visual element to be displayed; and
code for adding the visual element into the original video stream.

28. The product according to claim 26,
wherein the complementary information is configured to enable viewing of the video stream without display of the at least one visual element to the respective addressee.

29. The product according to claim 26, wherein the code for adding at least one visual element further comprises code for adding at least one visual element whose form, position and color are determined.

30. The product according to claim 26, wherein the code for adding at least one visual element further comprises adding at least one visual element whose form, position and color are variable.

31. The product according to claim 26, further comprising code for authorizing one or several private copies.

32. The product according to claim 26, wherein the code for providing complementary information is configured to provide the complementary information in real time, as the video stream is being reconstructed and displayed by equipment of the respective addressee.

33. The product according to claim 26, wherein position, form, color, and size of the at least one visual element added by said code for adding and a number of frames into which the at least one visual element is added by said code for adding are unique and personalized for the respective addressee.

34. A computer program product embodied on a non-transitory computer readable medium configured to distribute video streams, the product comprising:
- code for adding at least one visual element to an original video stream, wherein the at least one visual element is personalized for a respective addressee by addition of a visual element specific to the respective addressee, wherein the at least one visual element comprises at least one item of information, wherein adding the at least one visual element includes replacing at least one portion of the original video stream with the at least one visual element to generate a marked video stream;
- wherein the at least one item of information is configured to appear in its entirety within a single frame of the marked video stream;
- wherein the marked video stream is configured such that display of the marked video stream without reconstruction using the complementary information causes the at least one item of information to be visible to the unaided eye;
- wherein one or more frames containing the at least one item of information are present in the marked video stream, such that the at least one item of information is enabled to be displayed one or more times in the marked video stream; and
- wherein position, form, and size of the at least one visual element added in said adding and a number of frames into which the at least one visual element is added in said adding are obtained from a combinatory method relative to a group of addressees, and wherein the at least one visual object contains at least one part with an identical position for all addressees of the group, thereby representing an identifier of the group.

35. The process according to claim 34, further comprising:
- code for transmitting the marked video stream to at least one addressee; and
- code for transmitting complementary information to the at least one addressee to enable the at least one addressee to replace the at least one visual element with the part of the original video stream in the complementary information.

36. The process according to claim 35, wherein the complementary information includes position information corresponding to the part of the original video stream that is replaced by the code for adding.

37. A process for receiving and displaying video streams, the process comprising:
- receiving, by an addressee, a marked video stream including underlying video content marked with at least one visual element personalized for the addressee that is different from the at least one visual element for substantially any other addressee, the at least one visual element comprising at least one item of information, wherein the marked video stream is received via a first transport means; and
- receiving, by the addressee, via a second transport means different from the first transport means, in response to the addressee being authenticated, complementary information configured to enable viewing of a video stream corresponding to the marked video stream without the at least one item of information being visible to an unaided eye;
- wherein the marked video stream is configured such that display of the marked video stream without reconstruction using the complementary information causes the at least one item of information to be visible to the unaided eye; and
- wherein the at least one item of information is configured to be present in its entirety within a single frame of the marked video stream, and wherein one or more frames containing the at least one item of information are present in the marked video stream, such that the at least one item of information is enabled to be displayed one or more times in the marked video stream.

38. The process according to claim 37, wherein a combination of position, form, color, and size of the at least one visual element are unique and personalized for a respective addressee.

39. A process for receiving and displaying video streams, the process comprising:
- receiving, by an addressee, a marked video stream including underlying video content marked with at least one visual element personalized for the addressee that is different than for substantially any other addressee, the at least one visual element comprising at least one item of information;
- displaying the video stream such that the at least one item of information is visible to and allows for identification of the addressee by an unaided eye;
- wherein the at least one item of information is configured to be present in its entirety within a single frame of the marked video stream;
- wherein one or more frames containing the at least one item of information are present in the marked video stream, such that the at least one item of information is enabled to be displayed one or more times in the marked video stream;
- wherein position, form, and size of the at least one visual element are obtained from a combinatory method relative to a group of addressees, and wherein the at least one visual object contains at least one part with an identical position for all addressees of the group, thereby representing an identifier of the group.

40. A process for receiving and displaying video streams, the process comprising:
- receiving, by an addressee, a marked video stream including underlying video content marked with at least one visual element personalized for the addressee that is different than for substantially any other addressee, the at least one visual element comprising at least one item of information;

displaying the video stream such that the at least one item of information is visible to and allows for identification of the addressee by an unaided eye;

wherein the at least one item of information is configured to be present in its entirety within a single frame of the marked video stream;

wherein one or more frames containing the at least one item of information are present in the marked video stream, such that the at least one item of information is enabled to be displayed one or more times in the marked video stream; and wherein a number of frames into which the at least one visual element is present is obtained from a combinatory method relative to a group of addressees, and wherein the at least one visual object contains at least one part with an identical position for all addressees of the group, thereby representing an identifier of the group.

41. An apparatus for distributing video streams, comprising:

means for receiving, by an addressee, a marked video stream including underlying video content marked with at least one visual element personalized for the addressee that is different from the at least one visual element for substantially any other addressee, the at least one visual element comprising at least one item of information, wherein the marked video stream is received via a first transport means; and means for receiving, by the addressee, via a second transport means different from the first transport means, in response to the addressee being authenticated, complementary information configured to enable viewing of a video stream corresponding to the marked video stream without the at least one item of information being visible to an unaided eye;

wherein the marked video stream is configured such that display of the marked video stream without reconstruction using the complementary information cause the at least one item of information to be visible to the unaided eye and allows for identification of the addressee;

wherein the at least one item of information is configured to be present in its entirety within a single frame of the marked video stream; and wherein one or more frames containing the at least one item of information are present in the marked video stream, such that the at least one item of information is enabled to be displayed one or more times in the marked video stream.

42. The apparatus according to claim 41, wherein a combination of position, form, color, and size of the at least one visual element are unique and personalized for each addressee.

43. An apparatus for distributing video streams, comprising:

means for receiving, by an addressee, a marked video stream including underlying video content marked with at least one visual element personalized for the addressee that is different than for substantially any other addressee, the at least one visual element comprising at least one item of information; and means for displaying the video stream such that the at least one item of information is visible to and allows for identification of the addressee by an unaided eye;

wherein the at least one item of information is configured to be present in its entirety within a single frame of the marked video stream;

wherein one or more frames containing the at least one item of information are present in the marked video stream, such that the at least one item of information is enabled to be displayed one or more times in the marked video stream; and wherein position, form, and size of the at least one visual element are obtained from a combinatory method relative to a group of addressees, and wherein the at least one visual object contains at least one part with an identical position for all addressees of the group, thereby representing an identifier of the group.

44. An apparatus for distributing video streams, comprising:

means for receiving, by an addressee, a marked video stream including underlying video content marked with at least one visual element personalized for the addressee that is different than for substantially any other addressee, the at least one visual element comprising at least one item of information; and means for displaying the video stream such that the at least one item of information is visible to and allows for identification of the addressee by an unaided eye;

wherein the at least one item of information is configured to be present in its entirety within a single frame of the marked video stream;

wherein one or more frames containing the at least one item of information are present in the marked video stream, such that the at least one item of information is enabled to be displayed one or more times in the marked video stream; and wherein a number of frames into which the at least one visual element is present is obtained from a combinatory method relative to a group of addressees, and wherein the at least one visual object contains at least one part with an identical position for all addressees of the group, thereby representing an identifier of the group.

45. A computer program product embodied on a non-transitory computer readable medium configured to distribute video streams, the product comprising:

code for receiving, by an addressee, a marked video stream including underlying video content marked with at least one visual element personalized for the addressee that is different from the at least one visual element for substantially any other addressee, the at least one visual element comprising at least one item of information, wherein the marked video stream is received via a first transport means; and code for receiving, by the addressee, via a second transport means different from the first transport means, in response to authentication of the addressee, complementary information configured to enable viewing of a video stream corresponding to the marked video stream without the at least one item of information being visible to an unaided eye;

wherein the marked video stream is configured such that display of the marked video stream without reconstruction using the complementary information causes the at least one item of information to be visiable to the unaided eye;

wherein the at least one item of information is configured to be present in its entirety within a single frame of the marked video stream; and wherein one or more frames containing the at least one item of information are present in the marked video stream, such that the at least one item of information is enabled to be displayed one or more times in the marked video stream.

46. The product according to claim 45, wherein a combination of position, form, color, and size of the at least one visual element are unique and personalized for each addressee.

47. A computer program product embodied on a non-transitory computer readable medium configured to distribute video streams, the product comprising:
- code for receiving, by an addressee, a marked video stream including underlying video content marked with at least one visual element personalized for the addressee that is different from the at least one visual element for substantially any other addressee, the at least one visual element comprising at least one item of information; and
- code for displaying the video stream such that the at least one item of information is visible to and allows for identification of the addressee by an unaided eye;
- wherein the at least one item of information is configured to be present in its entirety within a single frame of the marked video stream;
- wherein one or more frames containing the at least one item of information are present in the marked video stream, such that the at least one item of information is enabled to be displayed one or more times in the marked video stream; and
- wherein position, form, and size of the at least one visual element are obtained from a combinatory method relative to a group of addressees, and wherein the at least one visual object contains at least one part with an identical position for all addressees of the group, thereby representing an identifier of the group.

48. A computer program product embodied on a non-transitory computer readable medium configured to distribute video streams, the product comprising:
- code for receiving, by an addressee, a marked video stream including underlying video content marked with at least one visual element personalized for the addressee that is different from the at least one visual element for substantially any other addressee, the at least one visual element comprising at least one item of information; and
- code for displaying the video stream such that the at least one item of information is visible to and allows for identification of the addressee by an unaided eye;
- wherein the at least one item of information is configured to be present in its entirety within a single frame of the marked video stream;
- wherein one or more frames containing the at least one item of information are present in the marked video stream, such that the at least one item of information is enabled to be displayed one or more times in the marked video stream; and
- wherein a number of frames into which the at least one visual element is present is obtained from a combinatory method relative to a group of addressees, and wherein the at least one visual object contains at least one part with an identical position for all addressees of the group, thereby representing an identifier of the group.

49. An apparatus for distributing video streams, comprising:
- a receiver, including:
  - a video processing module configured to receive a marked video stream including underlying video content marked with at least one visual element personalized for the addressee that is different than for substantially any other addressee, the at least one visual element comprising at least one item of information, wherein the marked video stream is received via a first transport means, and wherein the video processing module is further configured to receive, via a second transport means different from the first transport means, in response to the addressee being authenticated, complementary information configured to enable viewing of a reconstructed video stream corresponding to the marked video stream without the at least one item of information being visible to an unaided eye; and
  - a display output configured to output the marked video stream or the reconstructed video stream to a display;
- wherein the at least one item of information is configured to appear in its entirety within a single frame of the marked video stream;
- wherein the marked video stream is configured such that display of the marked video stream without reconstruction using the complementary information causes the at least one item of information to be visible to the unaided eye; and
- wherein one or more frames containing the at least one item of information are present in the marked video stream, such that the at least one item of information is enabled to be displayed one or more times in the marked video stream.

50. The apparatus according to claim 49, wherein a combination of position, form, color, and size of the at least one visual element are unique and personalized for each addressee.

51. An apparatus for distributing video streams, comprising:
- a receiver, including:
  - a video processing module configured to receive a marked video stream including underlying video content marked with at least one visual element personalized for the addressee that is different from the at least one visual element for substantially any other addressee, the at least one visual element comprising at least one item of information; and
  - a display output configured to output the marked video stream to a display;
- wherein the at least one item of information is configured to appear in its entirety within a single frame of the marked video stream;
- wherein the marked video stream is configured such that display of the marked video stream without reconstruction using the complementary information causes the at least one item of information to be visible to an unaided eye; and
- wherein one or more frames containing the at least one item of information are present in the marked video stream, such that the at least one item of information is enabled to be displayed one or more times in the marked video stream;
- wherein position, form, and size of the at least one visual element are obtained from a combinatory method relative to a group of addressees, and wherein the at least one visual object contains at least one part with an identical position for all addressees of the group, thereby representing an identifier of the group.

52. An apparatus for distributing video streams, comprising:
- a receiver, including:
  - a video processing module configured to receive a marked video stream including underlying video content marked with at least one visual element personalized for the addressee that is different from the at least one visual element for substantially any other addressee, the at least one visual element comprising at least one item of information; and a display output configured to output the marked video stream to a display;

wherein the at least one item of information is configured to appear in its entirety within a single frame of the marked video stream;

wherein the marked video stream is configured such that display of the marked video stream without reconstruction using the complementary information causes the at least one item of information to be visible to an unaided eye; and wherein one or more frames containing the at least one item of information are present in the marked video stream, such that the at least one item of information is enabled to be displayed one or more times in the marked video stream;

wherein a number of frames into which the at least one visual element is present is obtained from a combinatory method relative to a group of addressees, and wherein the at least one visual object contains at least one part with an identical position for all addressees of the group, thereby representing an identifier of the group.

* * * * *